United States Patent Office 2,791,582
Patented May 7, 1957

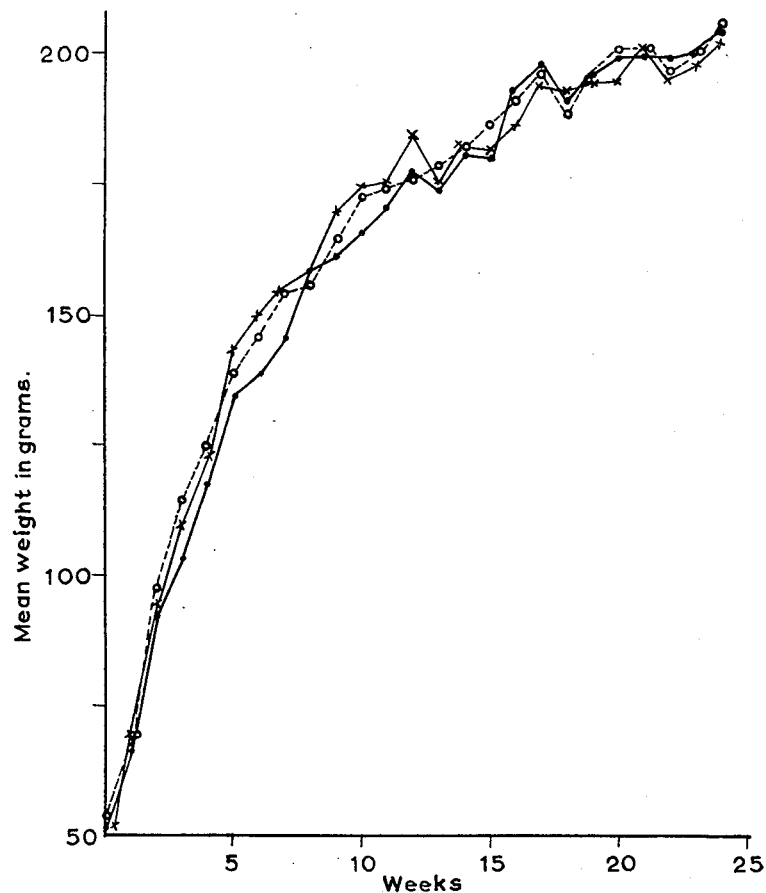
ABSENCE OF GROWTH INHIBITION IN YOUNG RATS BY DECAMETHYLENE 1:10-BIS-4-AMINOQUINALDINIUM DICHLORIDE ADMINISTERED IN DRINKING WATER
o---o 0·5% Decamethylene 1:10-bis-4-aminoquinaldinium dichloride
×——× 0·1% Decamethylene 1:10-bis-4-aminoquinaldinium dichloride
•——• No addition.

2,791,582

POLYALKYLENE BIS-1-(4-METHYL QUINALDINIUMS)

William Charles Austin and Henry Oswald Jackson Collier, Bethnal Green, London, Michael David Potter, Nottingham, and Edwin Percival Taylor, Bethnal Green, London, England, assignors to Allen & Hanburys Limited, London, England, a British company Application January 17, 1956, Serial No. 559,718

Claims priority, application Great Britain November 12, 1953

8 Claims. (Cl. 260—286)

The invention relates to heterocyclic polymethylene-bis-quaternary ammonium salts and is a continuation-in-part of our application Serial No. 464,892, filed October 26, 1954, now abandoned.

The novel compounds of the present invention are heterocyclic polymethylene-bis-quaternary ammonium salts of the general formula:

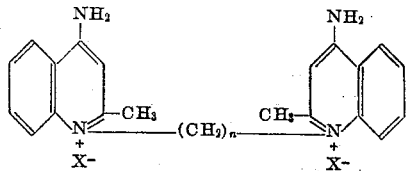

where $n$ is an integer of from 4 to 20 inclusive and X is an anion, for example a halogen.

The compounds of the present invention are useful antimicrobial agents.

The present invention also includes a process for the manufacture of the novel compounds of the present invention wherein one molecular proportion of a polymethylene dihalide containing from four to twenty inclusive carbon atoms in the molecule and more than two molecular proportions of 4-amino-quinaldine are heated together in an organic solvent for 48 to 450 hours.

The product may be isolated by cooling the reaction mixture and filtering off the solid; it may then be purified by recrystallisation.

Examples of organic solvents which may be used are: methyl ethyl ketone, methyl isobutyl carbinol, ethyl carbonate and nitromethane.

Preferably the heating is effected under reflux.

The resulting quaternary halide may be converted by conventional methods, e. g. double decomposition into other quaternary salts, such as the nitrate or methosulphate.

The following examples illustrate the invention:

EXAMPLE 1.—PREPARATION OF TETRAMETHYLENE 1:4-BIS-4-AMINO-QUINALDINIUM DI-IODIDE 0.51 g. of 4-amino-quinaldine, 0.34 g. of tetramethylene di-iodide and 20 ml. of methyl ethyl ketone were refluxed together for 400 hours. The mixture was allowed to cool, the precipitate filtered off, washed with methyl ethyl ketone, and recrystallised from a mixture of methyl alcohol and ethyl alcohol. The product was an off-white microcrystalline powder, melting point 340–341° C. (with decomposition).

EXAMPLE 2.—PREPARATION OF PENTAMETHYLENE 1:5-BIS-4-AMINO-QUINALDINIUM DI-IODIDE 0.94 g. of 4-amino-quinaldine, 0.65 g. of pentamethylene di-iodide and 10 ml. of methyl ethyl ketone were refluxed together for 104 hours. The mixture was allowed to cool, the precipitate filtered off, washed with methyl ethyl ketone, and recrystallised from a mixture of methyl alcohol and ethyl alcohol. The product was a pale pink tinted powder, melting point 293–294° C. (with decomposition).

EXAMPLE 3.—PREPARATION OF HEXAMETHYLENE 1:6-BIS-4-AMINO-QUINALDINIUM DI-IODIDE 42 g. of 4-amino-quinaldine, 35 g. of hexamethylene di-iodide and 350 ml. of methyl isobutyl carbinol were heated together at 110° C. for 76 hours. The mixture was allowed to cool, the precipitate filtered off, washed with methyl ethyl ketone, and recrystallised from ethyl alcohol containing a little methyl alcohol. The product was an almost white microcrystalline powder. Melting point 295–296° C. (with decomposition).

EXAMPLE 4.—PREPARATION OF HEXAMETHYLENE 1:6-BIS-4-AMINO-QUINALDINIUM DI-PERCHLORATE 0.2 g. of hexamethylene 1:6-bis-4-amino-quinaldinium di-iodide was dissolved in 150 ml. of boiling water and treated with a solution of 5 g. of sodium perchlorate in 5 ml. of water, when an immediate white precipitate separated. After cooling, the precipitate was filtered off, washed with water and recrystallised from a mixture of methyl alcohol and ethyl alcohol. The product was a microcrystalline white powder. Melting point 263–265° C. (with decomposition).

EXAMPLE 5.—PREPARATION OF HEPTAMETHYLENE 1:7-BIS-4-AMINO-QUINALDINIUM DI-IODIDE 0.47 g. of 4-amino-quinaldine, 0.35 g. of heptamethylene di-iodide and 15 ml. of methyl ethyl ketone were refluxed together for 310 hours. The mixture was allowed to cool, the precipitate filtered off, washed with methyl ethyl ketone and recrystallised from ethyl alcohol. The product consisted of cream coloured granules. Melting point 297° C. (with decomposition).

EXAMPLE 6.—PREPARATION OF OCTAMETHYLENE 1:8-BIS-4-AMINO-QUINALDINIUM DI-IODIDE 0.3 g. of 4-amino-quinaldine, 0.24 g. of octamethylene di-iodide and 15 ml. of methyl ethyl ketone were refluxed together for 180 hours. The mixture was allowed to cool, the precipitate filtered off, washed with methyl ethyl ketone, and recrystallised from the minimum amount of ethyl alcohol. The product was an off-white microcrystalline powder. Melting point 294–295° C. (with decomposition).

EXAMPLE 7.—PREPARATION OF NONAMETHYLENE 1:9-BIS-4-AMINO-QUINALDINIUM DI-IODIDE 0.47 g. of 4-amino-quinaldine, 0.38 g. of nonamethylene di-iodide and 15 ml. of methyl ethyl ketone were refluxed together for 380 hours. The mixture was allowed to cool, the precipitate filtered off, washed with methyl ethyl ketone and recrystallised from a mixture of methyl alcohol and ethyl alcohol. The product was a cream coloured powder. Melting point 288–289° C. (with decomposition).

EXAMPLE 8.—PREPARATION OF DECAMETHYLENE 1:10 - BIS - 4 - AMINO-QUINALDINIUM DI-IODIDE (a) 15 g. of 4-amino-quinaldine, 15 g. of decamethylene di-iodide and 200 ml. of methyl ethyl ketone were refluxed together for 400 hours. The mixture was allowed to cool, the precipitate filtered off, washed with methyl ethyl ketone, and recrystallised from ethyl alcohol containing a little methyl alcohol.

(b) 160 g. of 4-amino-quinaldine, 174 g. of decamethylene di-iodide and 1,500 ml. of methyl isobutyl carbinol were heated together at 120° C. for 90 hours. The mixture was allowed to cool, the precipitate filtered off, washed with methyl ethyl ketone and recrystallised from ethyl alcohol containing a little methyl alcohol.

The product obtained by both (a) and (b) consisted of a cream coloured powder. Melting point 308–309° C. (with decomposition).

EXAMPLE 9.—PREPARATION OF DECAMETHYLENE 1:10 - BIS - 4 - AMINO-QUINALDINIUM DI-NITRATE 1.0 g. of decamethylene 1:10-bis-4-amino-quinaldinium di-iodide was dissolved in 150 ml. of boiling ethyl alcohol and a solution of 0.5 g. of silver nitrate in 20 ml. of boiling ethyl alcohol was added. Silver iodide precipitated almost immediately. The reaction mixture was refluxed for five minutes, filtered, and the filtrate evaporated down to 30 ml. A small quantity of warm ether was then added to the solution and the resulting precipitate was filtered off and recrystallised from a mixture of ethyl alcohol and ether. The product consisted of small white needles. Melting point 299–301° C. (with decomposition).

EXAMPLE 10.—PREPARATION OF DECAMETHYLENE 1:10 - BIS - 4 - AMINO-QUINALDINIUM DICHLORIDE (a) 0.1 g. of decamethylene 1:10-bis-4-amino-quinaldinium di-nitrate was dissolved in 50 ml. of warm water and the solution saturated with sodium chloride. The precipitate was filtered off, washed with a minimum amount of water, and recrystallised from ethyl alcohol.

(b) 0.27 g. of decamethylene 1:10-bis-4-amino-quinaldinium di-iodide was dissolved in the minimum quantity of boiling methyl alcohol, and 0.2 g. of silver chloride added. The mixture was refluxed for 5 hours, filtered and the methyl alcohol removed from the filtrate. The residue was recrystallised from ethyl alcohol.

The product obtained by both (a) and (b) was a white powder. Melting point 317–318° C. (with decomposition).

EXAMPLE 11.—PREPARATION OF DODECAMETHYLENE 1:12 - BIS - 4 - AMINO-QUINALDINIUM DI-IODIDE 0.47 g. of 4-amino-quinaldine, 0.42 g. of dodecamethylene di-iodide and 10 ml. of methyl ethyl ketone were refluxed together for 350 hours. The mixture was allowed to cool, the precipitate filtered off, washed with methyl ethyl ketone, and recrystallised from a mixture of methyl alcohol and ethyl alcohol. The product was an off-white powder. Melting point 291–292° C. (with decomopsition).

EXAMPLE 12.—PREPARATION OF TETRADECAMETHYLENE 1:14 - BIS - 4 - AMINO-QUINALDINIUM DI-IODIDE 0.62 g. of 4-amino-quinaldine, 0.60 g. of tetradecamethylene di-iodide and 30 ml. of methyl ethyl ketone were refluxed together for 400 hours. The mixture was allowed to cool, the precipitate filtered off, washed with methyl ethyl ketone and recrystallised from a mixture of ethyl alcohol and ether. The product was an off-white microcrystalline powder. Melting point 266–267° C. (with decomposition).

EXAMPLE 13.—PREPARATION OF OCTADECAMETHYLENE 1:18 - BIS - 4 - AMINO-QUINALDINIUM DI-IODIDE 0.26 g. of 4-amino-quinaldine, 0.27 g. of octadecamethylene di-iodide and 10 ml. of methyl ethyl ketone were refluxed together for 270 hours. The mixture was allowed to cool, the precipitate filtered off, washed with methyl ethyl ketone and recrystallised from a mixture of ethyl alcohol and ether. The product was a white microcrystalline powder. Melting point 253–254° C. (with decomposition).

EXAMPLE 14.—PREPARATION OF EICOSANE 1:20-BIS-4-AMINO-QUINALDINIUM DI-IODIDE 0.4 g. of 4-amino-quinaldine, 0.53 g. of eicosane di-iodide and 15 ml. of methyl ethyl ketone were refluxed together for 450 hours. The mixture was allowed to cool, the precipitate filtered off, washed with methyl ethyl ketone, and recrystallised from ethyl alcohol. The product was a cream coloured powder. Melting point 241–242° C. (with decomposition).

EXAMPLE 15.—PREPARATION OF DECAMETHYLENE 1:10 - BIS - 4 - AMINO-QUINALDINIUM DIACETATE 5.3 g. of decamethylene 1:10-bis-4-aminoquinaldinium dichloride prepared as in Example 10, 4.5 g. of silver acetate and 150 ml. of methyl alcohol were heated together under reflux for 17 hours. After cooling, the reaction mixture was filtered and the filtrate refluxed for one hour with 0.25 g. of charcoal. This mixture was then filtered and the solvent removed from the filtrate by evaporation. The residue was added to 100 ml. of acetone and the mixture refluxed for half-an-hour. The mixture was then filtered and the solid material collected, dissolved with warming in 20 ml. of methyl alcohol and this solution was added with stirring to 150 ml. of warm acetone. When cold, the precipitated solid was filtered off and washed with acetone and recrystallised from a mixture of ethyl alcohol and acetone. The product was a white microcrystalline powder, melting point 282–284° C. (with decomposition).

EXAMPLE 16.—PREPARATION OF DECAMETHYLENE 1:10 - BIS - 4 - AMINOQUINALDINIUM DIBENZOATE 5.3 g. of decamethylene 1:10-bis-4-aminoquinaldinium dichloride, prepared as in Example 10, 5 g. of silver benzoate and 150 ml. of metyl alcohol were heated under reflux for 17 hours. After cooling, the reaction mixture was filtered and the filtrate refluxed for one hour with 0.25 g. of charcoal. This mixture was then filtered and the solvent removed from the filtrate by evaporation. The residue was recrystallised from ethyl alcohol. The product was a white crystalline substance, melting point 278° C. (with decomposition).

EXAMPLE 17.—PREPARATION OF DECAMETHYLENE 1:10-BIS-4 AMINO-QUINALDINIUM DI-UNDECYLENATE 15.0 g. of decamethylene 1:10-bis-4-aminoquinaldinium di-chloride, prepared as in Example 10, 25 g. of silver undecylenate and 450 ml. of methyl alcohol were heated together under reflux for 20 hours. After cooling, the reaction mixture was filtered and the filtrate refluxed for one hour with 0.5 g. of charcoal. The mixture was then filtered and the solvent removed from the filtrate by evaporation. The residue was stirred with 150 ml. of ethyl alcohol, the mixture was filtered and the solvent removed from the filtrate by evaporation. The residue was added to three successive portions of 100 ml. each of acetone and the mixture refluxed. The mixture was then filtered, the solid material collected and dried, and recrystallised from a mixture of ethyl alcohol and acetone. The product consisted of white microcrystalline needles, melting point 245–247° C. (with decomposition).

The antimicrobial activity of the compounds of the present invention has been investigated and the results are given below:

Table I.—*Activities of some polymethylene-bis-4-aminoquinaldinium di-iodides against 4 bacterial species in peptone water*

[Readings after 5 days at 37° C.]

| No. of Methylene Groups in Chain | Geometric Mean Minimal Inhibitory Concentration in μg. per ml. | | | |
|---|---|---|---|---|
| | Staph. aureus | Myco. phlei | P. vulgaris | Ps. pyocyanea |
| 8 | 0.67 | 1.97 | >100 | 100->100 |
| 10 | 0.35 | 1.66 | 63.0 | 67.3 |
| 12 | 0.35 | 0.88 | 35.4 | 70.7 |
| 14 | 0.39 | 0.79 | 35.4 | 84.1 |
| 16 | 0.67 | 1.69 | 70.7 | >100 |
| 18 | 0.99 | 3.95 | 70.7 | >100 |
| 20 | 2.48 | 70.7 | >100 | >100 |

In tube dilution tests the results of which are expressed in Table II the following media were used:
(a) *Fungi*: Sabouraud's broth.
(b) *Actinomyces dermatonomus*: 1% peptone in water containing 0.5% dextrose, 0.5% sodium chloride, 1% beef extract, the medium being adjusted to pH 7.2.
(c) *Streptococcus pyogenes*: 10% horse serum was added after autoclaving to the following medium—1% peptone in water containing 0.5% dextrose and 0.5% sodium chloride and adjusted to pH 7.2.
(d) *Mycobacterium tuberculosis*: Dubos' medium with 4% bovine albumin.
(e) *Remaining organisms*: 1% peptone in water containing 0.5% dextrose and 0.5% sodium chloride and adjusted to pH 7.2.

Table II.—*Activity of decamethylene 1:10-bis-4-aminoquinaldinium di-iodide against various microbial species*

[The numbers in brackets indicate the number of strains tested.]

| Microbial Species | Geometric Mean Minimal Inhibitory Concentration in μg. per ml. at— | | | |
|---|---|---|---|---|
| | 24 hrs. | 5 days | 14 days | 28 days |
| *Actinomyces dermatonomus* | 0.63 | 0.63 | | |
| *Bacterium coli* | 6.87 | 11.9 | | |
| *Bacillus subtilis* | 2.50 | 2.50 | | |
| *Corynebacterium diphtheriae* | 0.31 | 0.35 | | |
| *Haemophilus influenzae* | 17.7 | 25.0 | | |
| *Mycobacterium phlei* | 1.54 | 1.66 | | |
| *Mycobacterium tuberculosis* | | | 2.14 | 2.69 |
| *Neisseria catarrhalis* | 1.25 | 2.5 | | |
| *Pseudomonas pyrocyanea* | 41.0 | 67.3 | | |
| *Proteus vulgaris* (2) | 50.0–59.5 | 63.0–70.7 | | |
| *Salmonella dublin* | 25.0 | 50.0 | | |
| *Salmonella typhi* | 2.70 | 6.80 | | |
| *Salmonella typhimurium* | 25.0 | 50.0 | | |
| *Staphylococcus aureus* (CN491) | 0.32 | 0.35 | | |
| *Staphylococcus aureus* (2) | 0.63 | 0.63–0.88 | | |
| *Streptococcus agalactiae* | 0.63 | 0.88 | | |
| *Streptococcus dysgalactiae* (2) | 0.44–1.25 | 0.63–1.25 | | |
| *Streptococcus faecalis* | 1.66 | 2.79 | | |
| *Streptococcus pneumoniae* | 2.5 | 5.0 | | |
| *Streptococcus pyogenes* (CN10) | 1.10 | 1.10 | | |
| *Streptococcus pyogenes* (3) | 0.31–0.88 | 0.44–1.25 | | |
| *Streptococcus uberis* (2) | 0.79–1.25 | 0.99–2.50 | | |
| *Vibrio cholerae* | 4.26 | 5.36 | | |
| *Candida albicans* | | | 4.47 | |
| *Microsporum canis* | | | 1.67 | |
| *Trichophyton mentagrophytes* | | | 2.39 | |
| *Trichophyton rubrum* | | | 0.59 | |
| *Trichophyton verrucosum* | | | 1.67 | |

Decamethylene 1:10-bis-4-aminoquinaldinium dichloride was also tested against 12 penicillin resistant strains of Staphylococcus aureus recently isolated at the London Hospital and against 11 other penicillin resistant strains from various other sources isolated since 1951. The compound was active against every one of these 23 strains; the minimal inhibitory concentration in dextrose peptone medium after 5 days' incubation being 0.312 to 1.25 μg. per ml.

From the above it can be seen that the compounds of the present invention are active against a wide range of microorganisms and that they have the additional advantage of activity against strains which are resistant to penicillin.

In order to determine whether or not the activity of these compounds resides in the cation, a number of salts were prepared and tested for activity against the same organism. The result of these tests is given in Table III below from which it can be seen that the anion has no significant effect upon the activity.

Table III.—*Activity of some polymethylene 1:10-bis-4-aminoquinaldinium salts against Staphylococcus aureus in dextrose/peptone water*

| Salt | Minimal Inhibitory Concentration in μg. per ml. at 18 hours in terms of active cation |
|---|---|
| Bromide | 0.23 |
| Chloride | 0.17 |
| Iodide | 0.2 |
| Nitrate | 0.12 |
| Benzoate | 0.2 |
| Acetate | 0.25 |
| Perchlorate | 0.22 |
| Undecylenate | 0.17 |

The results of an experiment to determine the bactericidal action of decamethylene 1:10-bis-4-aminoquinaldinium dinitrate are given below (Table IV); at a concentration of 100 μg. per ml. the compound killed more than 99.99 percent of the organisms.

Table IV.—*Bactericidal action of decamethylene 1:10-bis-4-aminoquinaldinium dinitrate on Staphylococcus aureus in buffered saline at pH 7.2 for 1 hour at 18° C.*

| Concentration of Drug in μg. per ml. | Mean Number of Survivors per ml. |
|---|---|
| 500 | <10 |
| 400 | <10 |
| 250 | $2 \times 10^2$ |
| 200 | $4 \times 10^3$ |
| 100 | $10^3$ |
| 50 | $10^7$ |
| None | $10^{14}$ |

When virulent organisms are administered to mice intraperitoneally and a drug is given half an hour later by the same route it is argued that the main protective effect is due to its direct action on bacteria at or near the site of injection. The local therapeutic action of some of the compounds has been investigated in this manner and the results of these experiments involving 888 mice are recorded below.

The compound was injected into mice infected with lethal doses of *Streptococcus pyogenes* or of *Staphylococcus aureus*. There was a considerable range of dosage which protected mice against the infection. The results of the test are given in Table V below in which LD50 indicates toxicity of the compound in infected mice and ED50 its protective action.

Table V

| Compound | Organism | LD50± Standard Error | ED50± Standard Error |
|---|---|---|---|
| Decamethylene 1:10-bis-4-aminoquinaldinium dichloride. | *Streptococcus pyogenes*. | 11.0±0.963 | 0.255±0.042 |
| Do | *Staphylococcus aureus*. | 8.61±1.15 | 1.1±0.14 |
| Dodecamethylene 1:12-bis-4-aminoquinaldinium di-iodide. | do | 16.98±8.88 | 0.63±0.09 |

The inhibitory activity of decamethylene 1:10-bis-4-aminoquinaldinium dichloride in the presence of sera was investigated and compared with that of other antibacterial compounds in current use and from Table VI below it will be seen that in these experiments the compound of the present invention was the only one not significantly affected by the presence of serum in high concentration.

*Table VI.—Effect of sera on the inhibition of Staphylococcus aureus by antibacterial agents in peptone water at 37° C.*

| Antibacterial | Serum added to Medium | Minimal Inhibitory Concentration in μg. per ml. | |
|---|---|---|---|
| | | 24 hrs. | 5 days |
| Decamethylene 1:10-bis-4-aminoquinaldinium dichloride | None | 0.31 | 0.31 |
| | 10% rabbit | 0.31 | 0.63 |
| | 10% bovine | 0.63 | 0.63 |
| | 10% horse | 0.63 | 0.63 |
| | 10% human | 0.31 | 0.63 |
| | 50% human | 0.63 | 0.63 |
| Cetrimide | None | 0.63 | 0.63 |
| | 10% human | 6.25 | 12.5 |
| Benzalkonium chloride | None | 0.31 | 0.63 |
| | 10% human | 6.25 | 6.25 |
| Domiphen bromide | None | 0.31 | 0.31 |
| | 10% human | 1.56 | 3.13 |
| Chlorhexidine diacetate | None | 0.25 | 0.25 |
| | 10% human | 2.5 | 5.0 |

The acute toxicities in mice of some of the compounds of the present invention are given below:

*Table VII.—Acute toxicities of some polymethylene 1:10-bis-4-aminoquinaldinium salts*

| No. of Polymethylene Groups in Chain | Salt | Route of Administration | LD50 in mg. per kg. of body weight |
|---|---|---|---|
| 10 | Di-iodide | Intraperitoneal | 20.9±2.9 |
| 12 | do | do | 15.1±1.1 |
| 14 | do | do | 18.9±2.1 |
| 10 | Dichloride | Intravenous | 1.9±0.2 |
| 10 | do | Subcutaneous | 70.0±6.6 |

Administered orally in 5% suspension in water 2 g. per kg. of body weight of decamethylene 1:10-bis-4-aminoquinaldinium dichloride failed to kill any of 20 mice.

The sub-acute toxicity of decamethylene 1:10-bis-4-aminoquinaldinium dichloride has also been investigated and it has been found that solutions containing 2 mg. of decamethylene 1:10-bis-4-aminoquinaldinium dichloride per ml. in normal saline had no apparent effect on the eyes of rabbits when instilled daily over a period of 2 weeks. 0.4% of decamethylene 1:10-bis-4-aminoquinaldinium dichloride or decamethylene 1:10-bis-4-aminoquinaldinium di-iodide in creams were applied daily over a period of 4 weeks to the shaved skins of rabbits without evoking any reaction. Similar experiments with decamethylene 1:10-bis-4-aminoquinaldinium dichloride were performed on hairless mice with the same result whereas application of chloroform to an area of skin resulted in a sharp reaction within 24 hours after the second application. This reaction consisted of erythema, induration and brownish pigmentation followed by some necrosis.

In chronic toxicity tests all rats receiving 0.05% of decamethylene 1:10-bis-4-aminoquinaldinium dichloride in their drinking water for 26 weeks survived. Compared with control animals, rats receiving decamethylene 1:10-bis-4-aminoquinaldinium dichloride in their drinking water showed no depression of growth, as is shown in the accompanying drawing. It will be seen from Table VIII below that blood examinations showed no substantial difference between treated and untreated rats. Histological examination of sections of brain, stomach, small and large intestines, liver, thyroid, spleen, kidney, heart, lung and ovary of all rats showed no pathological effects attributable to the compound.

*Table VIII.—Mean values obtained from blood examination of rats receiving decamethylene 1:10-bis-4-aminoquinaldinium dichloride in their drinking water for 26 weeks*

[L=lymphocytes: M=monocytes: N=neutrophils: B=basophils.]

| Percent drug in water | Percent haemoglobin | Erythrocytes per mm.³× 10⁶ | Leucocytes per mm.³× 10³ | Differential counts, percent | | | |
|---|---|---|---|---|---|---|---|
| | | | | L and M | N | E | B |
| 0.05 | 103 | 8.0 | 9.8 | 75.05 | 21.90 | 3.00 | 0.05 |
| 0.01 | 101 | 7.7 | 9.3 | 70.15 | 25.40 | 4.40 | 0.05 |
| Untreated controls | 100 | 7.8 | 10.5 | 75.45 | 20.30 | 4.25 | 0.00 |

In view of the fact that unlike many quaternary ammonium salts, the activity of the compounds of the present invention is very little affected by the presence of serum and in view also of their activity against penicillin-resistant strains of staphylococcus, it was thought that these compounds might encourage uneventful healing of wounds by preventing and combating infection. A clinical trial is in progress in which decamethylene 1:10-bis-4-aminoquinaldinium dichloride is being used as an agent for preventing infection and for combating existing infection in oral wounds. In the past, the treatment of such wounds has been directed almost entirely to the prevention and control of post-operative haemorrhage. For this purpose the materials used have been, for example, alginates, oxidised cellulose, fibrin foam and gelatin sponge. Gelatin sponge has, on the whole, been the most satisfactory material, but has the disadvantage that in open wounds it frequently becomes foul with a consequent impairment of healing. Local application of penicillin has not been satisfactory for this purpose according to Holland and Tain (1954), Oral. Surg. Med. and Path., 7, 145, who reported that in a clinical study of 560 dental extraction wounds 15,000–150,000 units of crystalline penicillin were inserted as tablets in 274 cases and as a control, tablets consisting of sterile lactose were inserted into 286 similar wounds. Their conclusions were, "This study indicates that the introduction of pure crystalline penicillin G tablets into extraction wounds in doses of 15,000 to 150,000 units does not significantly reduce the incidence of wheal osteitis." In the present trial a gelatin sponge impregnated with decamethylene 1:10-bis-4-aminoquinaldinium dichloride has been used to prevent infection in oral wounds and as a post-operative dressing in cases where infection exists. In no case where the decamethylene 1:10-bis-4-aminoquinaldinium dichloride impregnated material was used for post-operative haemorrhage did infection occur, although infected dental extraction wounds had been experienced with the use of gelatin sponge alone and with oxidised cellulose gauze. In the trial which is still proceeding more than 200 cases have been treated and there has been no failure of decamethylene 1:10-bis-4-aminoquinaldinium dichloride as a prophylactic and treatment of infected wounds and sockets has in every case been effective where decamethylene 1:10-bis-4-aminoquinaldinium dichloride has been applied.

What we claim is:

1. Heterocyclic polymethylene-bis-quaternary ammonium salts of the general formula:

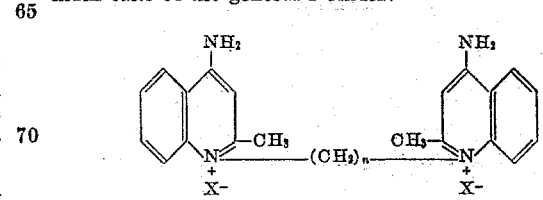

where $n$ is an integer of from 4 to 20 inclusive and X is an anion.

2. Heterocyclic polymethylene-bis-quaternary ammonium salts of the general formula:

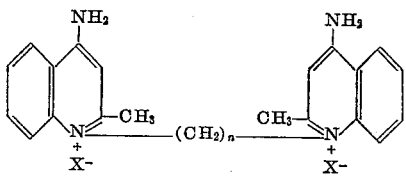

where $n$ is an integer of from 4 to 20 inclusive and X is a halogen.

3. Hexamethylene 1:6-bis-4-amino-quinaldinium dichloride.

4. Octamethylene 1:8-bis-4-amino-quinaldinium dichloride.

5. Decamethylene 1:10-bis-4-amino-quinaldinium dichloride.

6. Dodecamethylene 1:12-bis-4-amino-quinaldinium dichloride.

7. Tetradecamethylene 1:14-bis-4-amino-quinaldinium dichloride.

8. A process for the manufacture of heterocyclic polymethylene-bis-quaternary ammonium salts of the general formula:

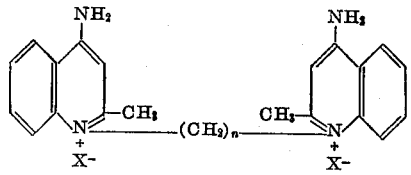

where $n$ is an integer of from 4 to 20 inclusive and X is an anion, which comprises heating one molecular proportion of a polymethylene dichloride containing from four to twenty inclusive carbon atoms in the molecule with more than two molecular proportions of 4-aminoquinaldine in an organic solvent for 48 to 450 hours.

No references cited.